United States Patent
Kim et al.

(10) Patent No.: US 9,634,559 B2
(45) Date of Patent: Apr. 25, 2017

(54) CHARGE PUMPING APPARATUS FOR LOW VOLTAGE AND HIGH EFFICIENCY OPERATION

(71) Applicant: The Hong Kong University of Science and Technology, Hong Kong (CN)

(72) Inventors: Jungmoon Kim, Seoul (KR); Kwok Tai Philip Mok, Hong Kong (CN); Chulwoo Kim, Seoul (KR)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 14/615,062

(22) Filed: Feb. 5, 2015

(65) Prior Publication Data

US 2015/0229207 A1      Aug. 13, 2015

Related U.S. Application Data

(60) Provisional application No. 61/965,762, filed on Feb. 7, 2014.

(51) Int. Cl.
*G05F 3/02* (2006.01)
*G05F 1/10* (2006.01)
*H02M 3/07* (2006.01)

(52) U.S. Cl.
CPC ........ *H02M 3/07* (2013.01); *H02M 2003/078* (2013.01)

(58) Field of Classification Search
CPC .. H02M 3/073; H02M 3/07; H02M 2003/077; G11C 5/145; G05F 3/205
USPC .......................................................... 327/536
See application file for complete search history.

(56) References Cited

U.S. PATENT DOCUMENTS

| | | | |
|---|---|---|---|
| 4,433,253 | A | 2/1984 | Zapisek |
| 5,081,371 | A | 1/1992 | Wong |
| 5,422,529 | A | 6/1995 | Lee |
| 5,736,892 | A | 4/1998 | Lee |

(Continued)

OTHER PUBLICATIONS

Chen, et al. "0.18-V input charge pump with forward body biasing in startup circuit using 65nm CMOS," in IEEE Custom Integrated Circuits Conference, Sep. 2010, pp. 239-242.

(Continued)

*Primary Examiner* — Quan Tra
(74) *Attorney, Agent, or Firm* — Leydig, Voit & Mayer, Ltd.

(57) ABSTRACT

A charge pump (CP) that operates at low input voltage with high power conversion efficiency is disclosed. A first embodiment provides a negative CP used for controlling load switches of a voltage doubler. Using a negative CP extends the operating region below ground to relieve the power delivery limitation of the CP. A second embodiment provides a low power adaptive dead-time circuit, which has several dead-time signals having different lengths of dead-times and selects one according to the input voltage level. A low input voltage detector in the adaptive dead-time circuit is used to determine which dead-time should be used. A third embodiment provides a switching body bias used for the low input voltage CP. The switching body bias uses both forward and reverse body bias applied to the CP to minimize reverse current and maximize power transfer. The first, second, and third embodiments can be used together or independently.

27 Claims, 14 Drawing Sheets

(56) References Cited

U.S. PATENT DOCUMENTS

| | | | |
|---|---|---|---|
| 5,939,935 | A | 8/1999 | Merritt |
| 6,064,251 | A | 5/2000 | Park |
| 6,081,455 | A | 6/2000 | Le et al. |
| 6,114,876 | A | 9/2000 | Kwong et al. |
| 6,121,822 | A | 9/2000 | Merritt |
| 6,552,397 | B1 | 4/2003 | Chi |
| 6,696,883 | B1 | 2/2004 | Wildon |
| 7,504,877 | B1 | 3/2009 | Voogel et al. |
| 7,681,060 | B2 | 3/2010 | Watanabe |
| 8,635,472 | B2 | 1/2014 | Watanabe et al. |
| 2004/0130385 | A1 | 7/2004 | Shor et al. |
| 2005/0200399 | A1 | 9/2005 | Pappalardo et al. |
| 2007/0127185 | A1 | 6/2007 | Watanabe |
| 2008/0048618 | A1 | 2/2008 | Melanson |
| 2008/0122522 | A1* | 5/2008 | Nagasawa et al. ........... 327/536 |
| 2008/0174360 | A1 | 7/2008 | Hsu |
| 2009/0140703 | A1* | 6/2009 | Kwon ........................... 323/222 |
| 2010/0085118 | A1 | 4/2010 | Chiu |
| 2010/0164600 | A1* | 7/2010 | Liu et al. ...................... 327/437 |
| 2010/0226166 | A1 | 9/2010 | Jung et al. |
| 2010/0289556 | A1* | 11/2010 | Byeon ........................... 327/536 |
| 2011/0095806 | A1* | 4/2011 | Seshita ......................... 327/333 |
| 2011/0248763 | A1* | 10/2011 | Kim et al. ..................... 327/295 |
| 2015/0263610 | A1* | 9/2015 | Ferrant ......................... 327/536 |

OTHER PUBLICATIONS

Chen, et al. "A 120-mV input, fully integrated dual-mode charge pump in 65-nm CMOS for thermoelectric energy harvester," in 17th Asia and South Pacific Design Automation Conference, Jan. 2012, pp. 469-470.

Dickson, John F. "On-chip high-voltage generation in MNOS integrated circuits using an improved voltage multiplier technique," IEEE J. Solid-State Circuits, vol. 11, No. 6, pp. 374-378, Jun. 1976.

Nakagome, et al. "An experimental 1.5V 64Mb DRAM," IEEE J. Solid-State Circuits, vol. 26, No. 4, pp. 465-472, Apr. 1991.

Favrat, et al. "A high-efficiency CMOS voltage doubler," IEEE J. Solid-State Circuits, vol. 33, pp. 410-416, Mar. 1998.

Drost, Brian, et al. "A 0.55V 61dB-SNR 67dB-SFDR 7MHz 4th-Order Butterworth Filter Using Ring-Oscillator-Based Integrators in 90nm CMOS," IEEE Int. Solid-State Circuits Conf., 2012, pp. 360-362.

Chang, Meng-Fan, et al., "A 0.5V 4Mb Logic-Process Compatible Embedded Resistive RAM (ReRAM) in 65nm CMOS Using Low-Voltage Current-Mode Sensing Scheme with 45ns Random Read Time," IEEE Int. Solid-State Circuits Conf., 2012, pp. 434-436.

Cha, Jeongwon, et al. "A Charge-Pump Based 0.35-um CMOS RF Switch Driver for Multi-Standard Operations", IEEE International Symposium on Circuits and Systems, 2008, pp. 452-455.

Shin, Jongshin, et al. "A New Charge Pump without Degradation in Threshold Voltage Due to Body Effect", IEEE Journal of Solid-State Circuits, vol. 35, No. 8, pp. 1227-1230, Aug. 2000.

Racape, Emmanuel, et al., "A PMOS-Switch based Charge Pump, Allowing Lost Cost Implementation on a CMOS Standard Process", Proceedings of the 31st European Solid-State Circuits Conference, 2005, pp. 77-80.

Tseng, I-Wei, et al., "An 18.7mW 10-GHz Phase-Locked Loop Circuit in 0.13-µm CMOS", International Symposium on VLSI Design, Automation and Test, 2009, pp. 227-230.

Kamae, Norihiro, et al., "An Area Effective Forward/Reverse Body Bias Generator for Within-Die Variability Compensation", IEEE Asian Solid State Circuits Conference, 2011.

Cha, Jeongwon, et al., "Analysis and Design Techniques of CMOS Charge-Pump-Based Radio-Frequency Antenna-Switch Controllers", IEEE Transaction on Circuits and Systems I: Regular Papers, Vo. 56, No. 5, pp. 1053-1062, May 2009.

Chen, Chih-Yang, et al., "Analysis of Negative Bias Temperature Instability in Body-Tied Low-Temperature Polycrystalline Silicon Thin-Film Transistors", IEEE Electron Device Letters, vo. 29, No. 2, pp. 165-167, Feb. 2008.

Loy, Liang-Yu, et al. "Body-bootstrapped-buffer circuit for CMOS static power reduction", IEEE Asia Pacific Conference on Circuits and Systems, 2008.

Zhang, E.X., et al., "Charge Pumping and DCIV currents in SOI FinFETs", International emiconductor Device Research Symposium, 2011, (2 pages total).

Peng, Huan, et al., "CMOS Startup Charge Pump With Body Bias and Backward Control for Energy Harvesting Step-Up Converters", IEEE Transactions on Circuits and Systems I: Regular Papers, vol. 61, No. 6, pp. 1618-1628, Jun. 2014.

Kim, Chris H., et al. "Dynamic VTH Scaling Scheme for Active Leakage Power Reduction", Proceedings Design, Automation and Test in Europe Conference and Exhibition. 2002, (5 pages total).

Baron, Filipp A., et al. "Effect of Magnetic Field on Random Telegraph Noise in the Source Current of p-channel Metal-Oxide-Semiconductor Field-Effect Transistors", Applied Physics Letters, vol. 83, No. 4, pp. 710-712, Jul. 2003.

Duyet, Tran Ngoc, et al., "Effects of Body Reverse Pulse Bias on Geometric Component of Charge Pumping Current in FD SOI MOSFETs", IEEE International SOI Conference, 1998, pp. 79-80.

Ikeda, Keiji, et al., "First Demonstration of Threshold Voltage Control by Sub-1V Back-Gate Biasing for Thin Body and Burried-Oxide (TBB) Ge-on-Insulator (GOI) MOSFETs for Low-Power Operation", IEEE International SOI Conference, 2012, (2 pages total).

Li, Yin, et al., "Low input Voltage Charge Pump with Dynamic Body Biasing", 25th IEEE Canadian Conference on Electrical & Computer Engineering, 2012, (4 page s total).

Kim, Sungho, et al., "Optically Assisted Charge Pumping on Floating-Body FETs", IEEE Electron Device Letters, vo. 31, No. 12, pp. 1365-1367, Dec. 2010.

Liu, P., et al., "PLL Charge Pump with Adaptive Body-Bias Compensation for Minimum Current Variation", Electronics Letters, vo. 48, No. 1, pp. 16-18, Jan. 2012, (2 pages total).

Sah. Chih-Tang, et al., "Profiling Interface traps in MOS Transistors by the DC Current-Voltage Method", IEEE Electron Device Letters, vo. 17, No. 2, pp. 72-74, Feb. 1996.

Bol, David, et al., "Quasi-Double Gate Mode for Sleep Transistors in UTBB FD SOI Low-Power High-Speed Applications", IEEE International SOI Conference, 2012, (2 pages total).

Zhang, Xlwen, et al., "An Efficiency-Enhanced Auto-Reconfigurable 2x/3x SC Charge Pump for Transcutaneous Power", IEEE Journal of Solid-State Circuits, vol. 45, No. 9, pp. 1906-1922, Sep. 2010.

Shen, LuFei, et al. "Fully Integratable 4-Phase Charge Pump Architecture for High Voltage Applications", Proceedings of the 19th International Conference Mixed Design of Integrated Circuits and Systems, 2012, pp. 265-268.

Torkhov N.A., et al. "Modified operating regime of gallium arsenide Gunn diodes with thin base", 20th International Crimean Conference Microwave and Telecommunication Technology, 2010.

Kim, Jungmoon et al., "A Low-Voltage High-Efficiency Voltage Doubler for Thermoelectric Energy Harvesting", IEEE International Conference of Electron Devices and Solid-State Circuits, 2013 (2 pages total).

Kilinc, Selcuk, et al., "A New Model for Voltage Output Charge-Pump Phase Frequency Detector in Resonant Inverter Tuning Loops", The 47th Midwest Symposium on Circuits and Systems, 2004, pp. II-301-II-304.

Umeki, Yohei, et al. "A 0.38-V operating STT-MRAM with process variation tolerant sense amplifier", IEEE Asian Solid-State Circuits Conference, 2013.

"IEEE Standard Definitions for Power Switchgear", IEEE Power & Energy Society, 1992, (82 pages total).

* cited by examiner

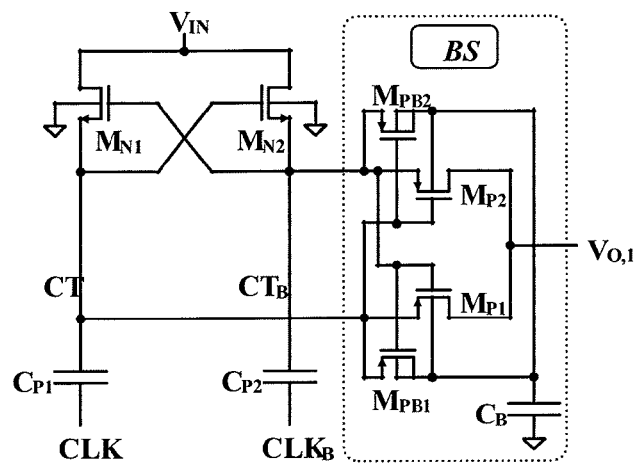
FIG. 3
(PRIOR ART)
|  | $M_{N1}$, $M_{N2}$ | $M_{P1}$, $M_{P2}$ |
|---|---|---|
| ON | Low $I_{ON}$ | Normal $I_{ON}$ |
|  | Reverse bias | No body effect |
| OFF | Low leakage | Normal leakage |
|  | Reverse bias | No body effect |
FIG. 4
(PRIOR ART)
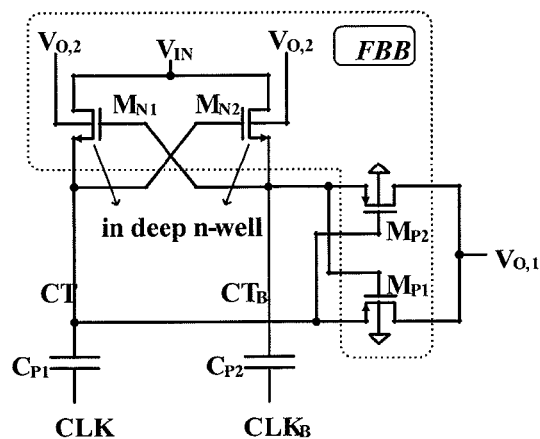
FIG. 5
(PRIOR ART)

|  | $M_{N1}, M_{N2}$ | $M_{P1}, M_{P2}$ |
|---|---|---|
| ON | High $I_{ON}$ | High $I_{ON}$ |
|  | Forward bias | Forward bias |
| OFF | High leakage | High leakage |
|  | Forward bias | Forward bias |

| | $M_{N1}$, $M_{N2}$ | $M_{P1}$, $M_{P2}$ |
|---|---|---|
| ON | High $I_{ON}$ | High $I_{ON}$ |
| | Forward bias | Forward bias |
| OFF | Low leakage | Low leakage |
| | Reverse bias | Reverse bias |

CHARGE PUMPING APPARATUS FOR LOW VOLTAGE AND HIGH EFFICIENCY OPERATION

CROSS-REFERENCE TO RELATED APPLICATIONS

This patent application claims the benefit of U.S. provisional application No. 61/965,762, filed on Feb. 7, 2014, which is hereby incorporated by reference in its entirety.

TECHNICAL FIELD

The present disclosure relates to electronic circuits and, more particularly, to a charge pumping apparatus for low voltage and high efficiency operation.

BACKGROUND

Recently, low input voltage ($V_{IN}$) charge pumps for low voltage and low power electronics device applications were composed with direct current (DC)-to-DC converters using a large inductor. In some conventional approaches, charge pumps use an advanced process technology to push the input voltage down to the sub-threshold region. One conventional approach for a 3-stage voltage doubler uses a forward body biasing (FBB) technique, which improves the voltage conversion efficiency (VCE) for low input voltages. However, this approach suffers from poor power conversion efficiency. Also, in another conventional approach, the charge pump can use the forward body bias to regulate the output voltage of a charge pump to the reference voltage. In yet another conventional approach, a charge pump can be implemented using a 10-stage design, which achieves a low operation voltage. However, a 10-stage charge pump design provides low output power.

Most capacitive voltage multipliers used to generate a DC voltage higher than the supply voltage are based on the Dickson charge pump, which takes a DC supply as its input, so it is a form of DC-to-DC converter. Typically, the Dickson multiplier is intended for a low voltage purpose.

Some conventional charge pump cells include cross-coupled NMOS transistors and pumping capacitors. When a charge pump cell uses NMOS transistors, two outputs of the cell are connected together to a single output via PMOS transistors, which is called a dual series switch or load switches, to avoid a large threshold voltage ($V_{TH}$) drop for low voltage applications.

There are two kinds of methods to drive load switches. FIG. 1 shows a voltage doubler with cross-coupled load switches, according to the prior art. The load switches are self-driven by pumped input signals CT and $CT_B$. This type of voltage doubler is called "CP-cross."

FIG. 2 shows a voltage doubler with load switches driven by a level shifter (LS), according to the prior art. A voltage doubler with load switches driven by a level shifter improves the conductance of the dual series switches. This type of voltage doubler is called "CP-LS." However, prior arts such as CP-cross and CP-LS show poor performance at low input voltages.

Usually, the body of NMOS transistors is applied to the most negative voltage in the circuit design; whereas, the body of PMOS transistors is applied to the most positive voltage. The conventional CP-cross can be improved by using a bulk switching (BS) technique, as shown in FIG. 3. FIG. 4 shows a detailed switching operation of the circuit shown in FIG. 3. In FIG. 3, the NMOS switches $M_{N1}$ and $M_{N2}$ always provides the bulk-to-source PN junction in the reverse bias mode. This means that low leakage current can be guaranteed during the off state of the NMOS switches $M_{N1}$ and $M_{N2}$. At the same time, the use of NMOS is a better choice than using PMOS because of higher mobility. The BS technique keeps the body of the PMOS switches at the highest voltage, even though the load current is heavy so that the voltage drop at the output is large, which avoids degradation of the threshold voltage due to the body effect.

However, the conventional biasing approach is not effective at low input voltage. As the input voltage reaches $V_{TH,N}+V_{TH,P}$, where $V_{TH,N}$ is an NMOS threshold voltage and $V_{TH,P}$ is a PMOS threshold voltage, reverse body biasing (RBB) for NMOS prevents NMOS switches from being turned on. Therefore, the forward body biasing (FBB) for low voltage operations was introduced in some approaches. In these approaches, higher current transfer via switches was considered to be more important than higher leakage current at low input voltages. FIG. 5 is a forward body biasing configuration for a voltage doubler, according to the prior art. As shown in FIG. 5, all MOSFETs are biased in the forward mode. FIG. 6 shows a detailed switching operation of the circuit shown in FIG. 5. In this biasing scheme, the NMOS transistors should be in deep n-well. The forward body biased switches present high on-current. The parasitic path of a lateral bipolar also contributes to delivering more current to the output. Nevertheless, high leakage current during off-state of switches degrades the power efficiency of such a voltage doubler.

Accordingly, there remains a need in the art for a charge pumping apparatus that overcomes the limitations of conventional approaches.

SUMMARY

One embodiment provides a charge pump circuit. The charge pump circuit includes two or more unit charge pumps arranged in series. Each unit charge pump includes: a first pumping capacitor, a second pumping capacitor, two cross-coupled NMOS switches, wherein the first pumping capacitor is coupled to the source of a first cross-coupled NMOS switch and the gate of the second cross-coupled NMOS switch, and the second pumping capacitor is coupled to the source of the second cross-coupled NMOS switch and the gate of the first cross-coupled NMOS switch, and four PMOS switches for switching body biasing applied to the two cross-coupled NMOS switches.

Another embodiment provides a charge pump circuit that includes: a first pumping capacitor; a second pumping capacitor; two cross-coupled NMOS switches, wherein the first pumping capacitor is coupled to the source of a first cross-coupled NMOS switch and the gate of the second cross-coupled NMOS switch, and the second pumping capacitor is coupled to the source of the second cross-coupled NMOS switch and the gate of the first cross-coupled NMOS switch; and, four PMOS switches for switching body biasing applied to the two cross-coupled NMOS switches.

Another embodiment provides an adaptive dead-time circuit, comprising: a short dead-time circuit; a long dead-time circuit, wherein a dead-time of the long dead-time circuit is longer than a dead-time of the short dead-time circuit; an input voltage detector coupled to an input voltage level of a charge pump circuit; and, a multiplexer configured to select an output of the short dead-time circuit or an output of the long dead-time circuit based on a signal from the input voltage detector as an output of the adaptive dead-time circuit.

Yet another embodiment provides a switch-conductance enhancer circuit coupled to a charge pump circuit, the switch-conductance enhancer circuit comprising: a negative charge pump that generates a negative voltage as output; and, auxiliary charge pumps coupled to an output of the negative charge pump, wherein an output voltage level of the charge pump circuit is generated by the auxiliary charge pumps.

Other aspects, objectives and advantages of the disclosure will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present disclosure and, together with the description, serve to explain the principles of the disclosure.

FIG. 3 shows a bulk switching (BS) technique for a voltage doubler, according to the prior art.

FIG. 4 shows a detailed switching operation of the circuit shown in FIG. 3.

FIG. 5 is a forward body biasing configuration for a voltage doubler, according to the prior art.

DETAILED DESCRIPTION

Embodiments of the disclosure include provide a charge pump (CP) that operates at low input voltage with high power conversion efficiency. In a first embodiment, a negative charge pump is used for controlling load switches of a voltage doubler. When the switches are made of p-channel transistors, the turn-on voltage of the switches becomes too low to maintain efficiency as the input voltage decreases. Using a negative charge pump for extending the operating region below ground relieves the power delivery limitation of the charge pump. In a second embodiment, a low power adaptive dead-time is used, which has several dead-time signals having different lengths of dead-times (e.g., long or short) and selects one of them according to the input voltage level. A low input voltage detector in the adaptive dead-time circuit is used to determine which dead-time should be used. In a third embodiment, a switching body bias is used for the low input voltage charge pump. The existing forward body bias technique causes a reverse current. The switching body bias technique using both forward body bias and reverse body bias applied to the charge pump to minimize reverse current and maximize power transfer. The switching body bias is effectively implemented with a circuit that consists of the minimum number of transistors. The aforementioned first, second, and third embodiments can be used together or independently to improve the power efficiency of the charge pump. Each of the first and second embodiments (namely, utilizing a negative charge pump and adaptive dead-time) increases the efficiency of the charge pump, particularly at low voltage operation. The third embodiment (namely, switching body bias) is effective at both low voltage and high voltage operations. In some example implementation, all three embodiments could be used together for a low voltage operation, while the three embodiments can be used selectively for mid-to-high voltage operations.

Figure 1:
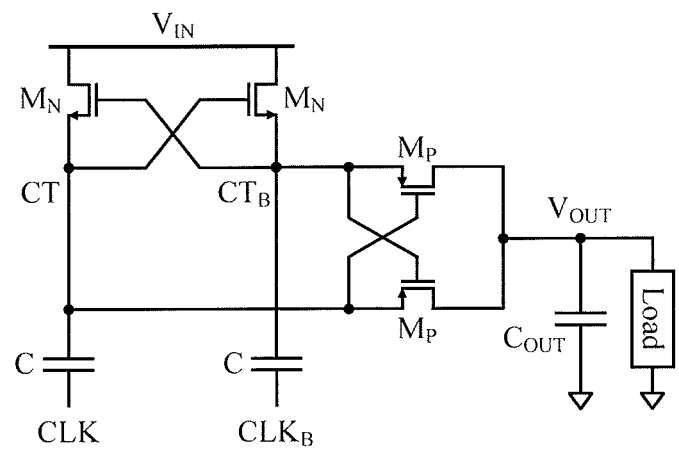
FIG. 1 shows a voltage doubler with cross-coupled load switches, according to the prior art.
Figure 2:
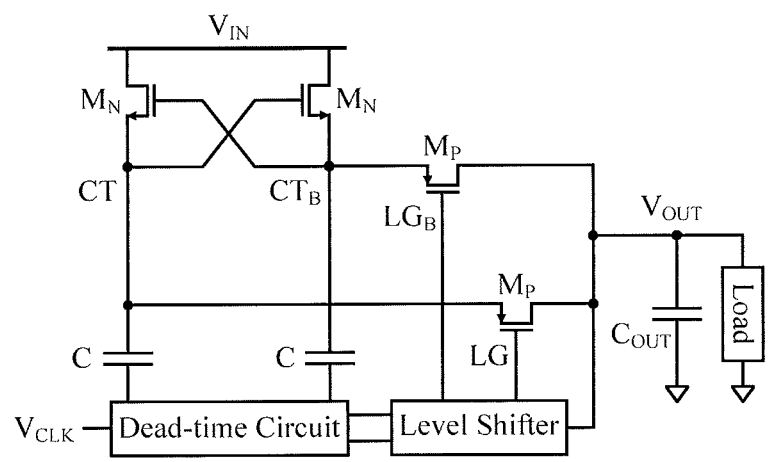
FIG. 2 shows a voltage doubler with load switches driven by a level shifter (LS), according to the prior art.
Figures 6, 7:
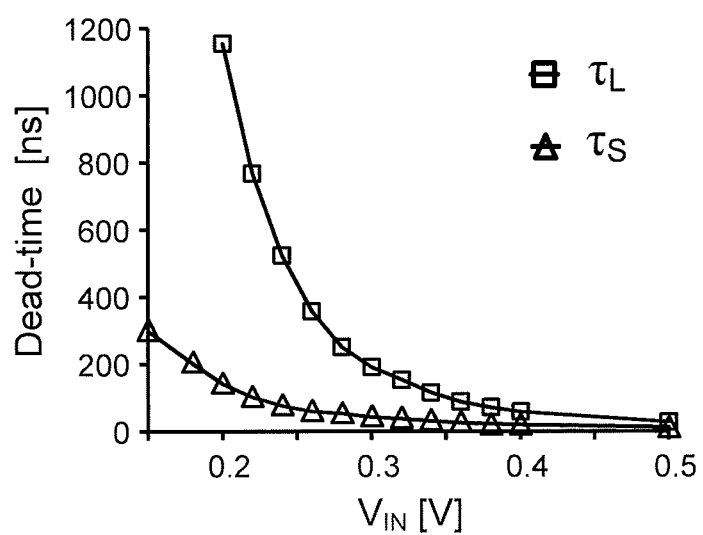
FIG. 6 shows a detailed switching operation of the circuit shown in FIG. 5.
FIG. 7 shows the non-overlapping period (dead-time) of clock signals for a charge pump as a function of $V_{IN}$ for two different fixed dead-times, according to one embodiment of the disclosure.

FIG. 7 shows the non-overlapping period (dead-time) of clock signals for a charge pump as a function of $V_{IN}$ for two different fixed dead-times circuits, according to one embodiment of the disclosure. The line marked with squares indicates the non-overlapping period of signals that a long dead-time circuit produces, while the line marked with triangles is the non-overlapping period of a short dead-time circuit. The long dead-time circuit is good at high $V_{IN}$, and the short dead-time circuit is good at low $V_{IN}$. More specifically, at high input voltages, the dead-time ($\tau_L$) is long enough to avoid a short circuit current. As the input voltage decreases, the dead-time ($\tau_S$) is so prohibitively increased that the on-duty of the signal disappears. Therefore, according to some embodiments, the dead-time is adaptively controlled by properly selecting the output of the dead-time circuit generating $\tau_S$.

Figure 8:
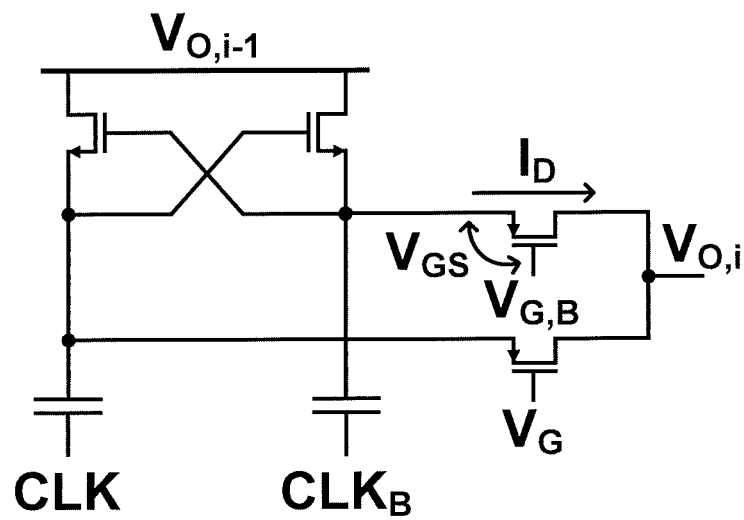
FIG. 8 shows a schematic diagram of a voltage doubler including PMOS load switches, according to one embodiment of the disclosure.

FIG. 8 shows a schematic diagram of a voltage doubler including PMOS load switches, according to one embodiment of the disclosure. A gate-source voltage ($V_{GS}$) determines the conductance of the switch, which is proportional to the switch on-current $I_D$. Therefore, the swing range of driving signals $V_G$ and $V_{G,B}$ is important. Driving signals $V_G$ and $V_{G,B}$ turn on and off the PMOS load switches. Driving signals $V_G$ and $V_{G,B}$ are complimentary signals, so they have the opposite phase. For example, if $V_G$ is high, $V_{G,B}$ is low.

Figure 9:
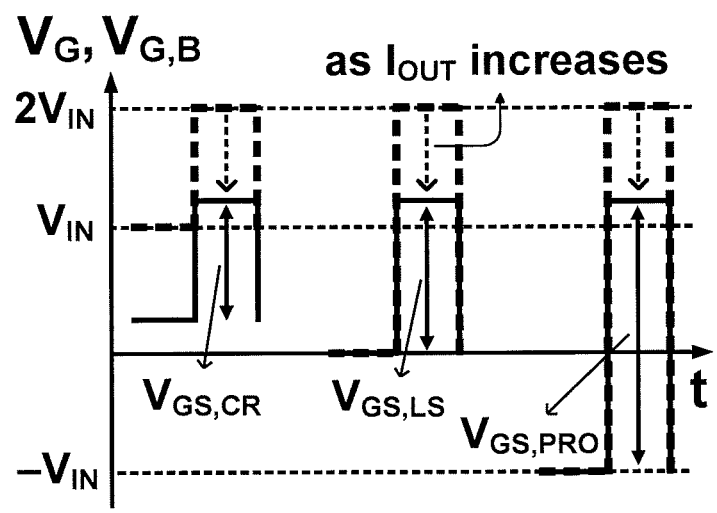
FIG. 9 shows a conductance comparison of PMOS load switches, according to one embodiment of the disclosure.

FIG. 9 shows a conductance comparison of PMOS load switches at low input voltages among CP-cross, CP-LS, and the proposed voltage doubler shown in FIG. 8, according to one embodiment. In a first stage, the gates of the series switches are driven between $V_{IN}$ and $2V_{IN}$ in the CP-cross, while the gates are driven between 0 and $2V_{IN}$ in the CP-LS, as shown in FIG. 9. Therefore, The CP-LS has a better switch conductance than the CP-cross. However, the CP-LS fails at low voltage operation due to a reverse current through the series switches. This means that in the CP-LS, the load switches are always turned on or weakly turned off as unintended consequences because driving signals $V_G$ and $V_{G,B}$ of the malfunctioning LS stay at the ground. Moreover, when $V_{IN}$ is around $V_{TH}$ or less than $V_{TH}$ (i.e., $V_{GS,CR}$ or $V_{GS,LS}$ is less than $V_{TH,P}$, where $V_{GS,CR}$ is on-voltage of the load switch in CP-cross and $V_{GS,LS}$ in CP-LS) or the output voltage $V_{O,i}$ is decreased owing to a heavy load, there is no gain from the increased $V_{GS}$ of the series switch, as shown in FIG. 9. However, in the voltage doubler shown in FIG. 8, a negative charge pump is used to push the range of on-voltage $V_G$ and $V_{G,B}$ ($V_{GS,PRO}$) of the PMOS load switch to the negative region below ground. When the input voltage $V_{O,i-1}$ is too low for the main doubler to have enough on-voltage, even additional small turn-on voltage significantly improves an ability of power transfer in the sub-threshold region.

According to some embodiments, for high efficiency and low leakage current, all switches at on-state should be in the forward mode for high on-current, while the switches at off-state are in the reverse mode for low leakage current. The dynamic body biasing scheme adjusting the $V_{TH}$ for controlling sub-threshold leakage has been introduced for low power VLSI (very-large-scale integration) systems in many literatures. This body biasing scheme is also known as the variable $V_{TH}$ CMOS scheme (VTCMOS) or adaptive body biasing (ABB). Though VTCMOS and ABB are not strictly the same, they are both modulating the threshold voltage. The dynamic body biasing techniques are still effectively used, for example, to compensate for parameter variations and reducing the leakage power.

Figures 10, 11:
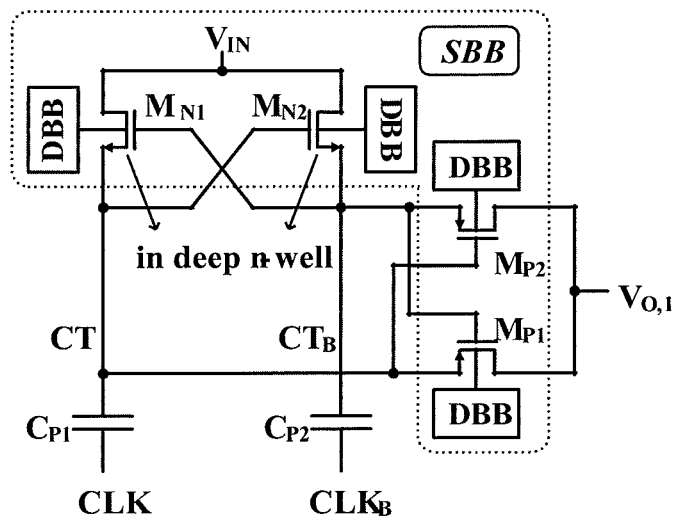
FIG. 10 shows a circuit diagram of a switching body bias (SBB) technique for a low voltage charge pump, according to one embodiment.
FIG. 11 shows a detailed switching operation of the circuit shown in FIG. 10.

FIG. 10 shows a circuit diagram of a switching body bias (SBB) technique for a low voltage charge pump, according to one embodiment. As shown, the circuit includes two cross-coupled deep n-well NMOS switches $M_{N1}$ and $M_{N2}$ connected to two PMOS switches $M_{P1}$ and $M_{P2}$. FIG. 11 shows a detailed switching operation of the circuit shown in FIG. 10. Each dynamic body bias (DBB) in FIG. 10 may include two switches connecting the corresponding MOSFET body to high voltage and low voltage. In some embodiments, the MOSFET threshold voltage $V_{TH}$ defines the boundary between low and high input voltages. In the circuit of FIG. 10, the proper biasing for each MOSFET switch allows $V_{TH}$ to be suitably controlled according to the on and off state of the MOSFET. However, the efficient switching control for the body biasing requires new control signals and devices. Additional cost for the switching operation should be minimized.

Figure 12A:
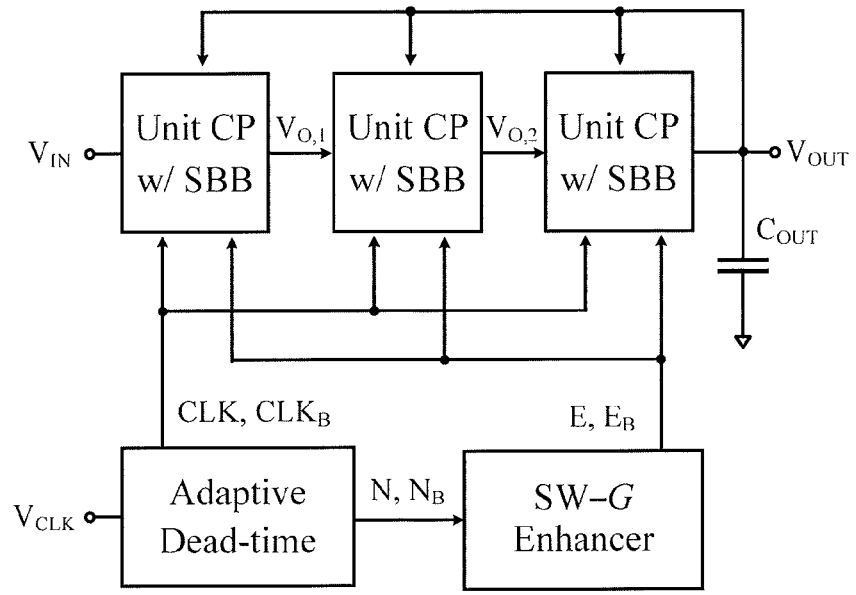
FIG. 12A shows a block diagram of a three-stage charge pump, according to one embodiment of the disclosure.
Figure 12B:
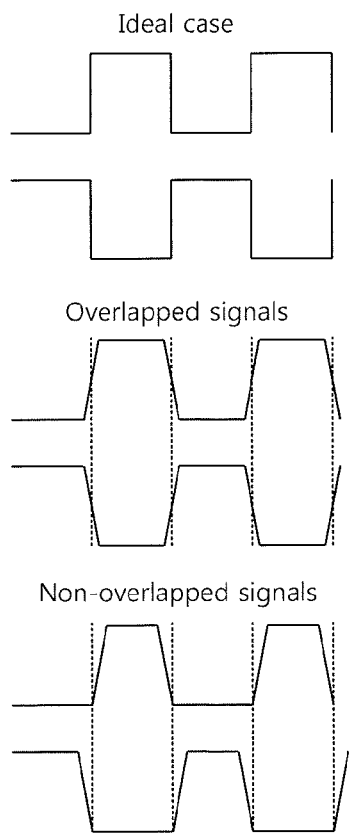
FIG. 12B shows two ideal complementary signals, overlapped signals, and two non-overlapped signals, according to one embodiment of the disclosure.
Figure 13:
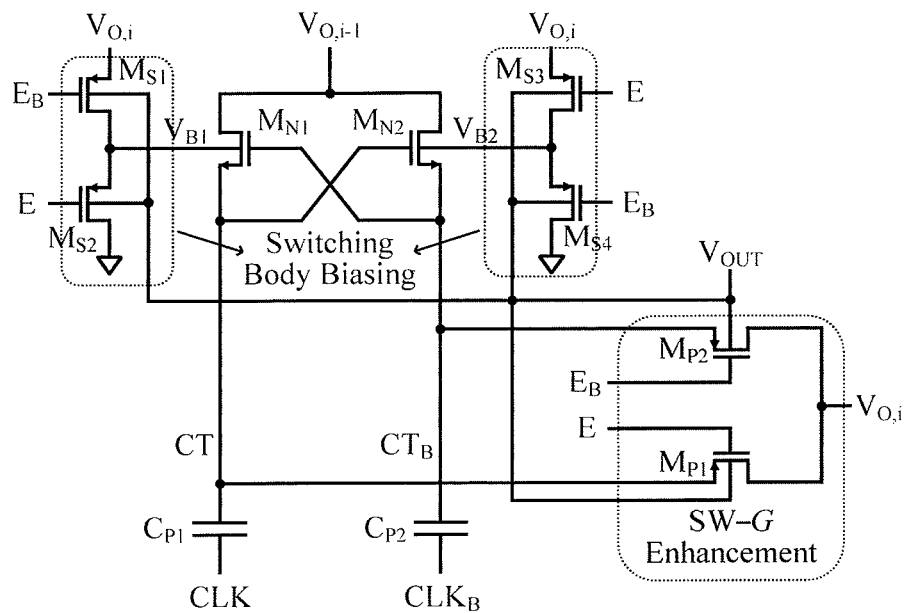
FIG. 13 shows a circuit diagram for a unit charge pump with switching body biasing and conductance-enhanced dual series switch, according to one embodiment of the disclosure.

FIG. 12A shows a block diagram of a three-stage charge pump, according to one embodiment of the disclosure. More specifically, FIG. 12A shows a block diagram of a charge pump with switching body biasing (SBB), adaptive dead-time, and SW-G enhancement techniques, as disclosed herein. Each of the three unit charge pumps includes a voltage doubler, a dual-series PMOS switch, and four switches for SBB, as shown in FIG. 13. In FIG. 12A, four clock signals (i.e., CLK, $CLK_B$, N, and $N_B$) are generated from the input clock ($V_{CLK}$) by the adaptive dead-time (AD) circuit, which minimizes the dead-time for high PCE (power conversion efficiency) of the charge pump. Complementary signals CLK and $CLK_B$ are overlapped, while two pairs of complementary signals, $N/N_B$ and $E/E_B$, are non-overlapped. As shown in the example diagram in FIG. 12B, two ideal complementary signals have the opposite phase, 180° degrees. Thus, if one signal is high, the other is low. When the signals change low to high or high to low, they both may be high for a short moment in the non-ideal condition. As used herein, overlapped signals are two complementary signals that transition low to high or high to low at the same time. Non-overlapped are two complementary signals that do not transition low to high or high to low at the same time.

Referring back to FIG. 12A, the former four signals (CLK/$CLK_B$ and N/$N_B$) from buffers are swinging between 0 and $V_{IN}$. The latter signals (E/$E_B$) from the SW-G enhancer are driven between $-V_{IN}$ and $V_{OUT}$. The switch conductance (SW-G) enhancer improves the conductance of the dual series switch of each charge pump. The SW-G enhancer generates the signals E and $E_B$ to control the load switches in the Unit CP and the switches for SBB.

As described, FIG. 13 shows a circuit diagram for a unit charge pump from FIG. 12 with switching body biasing and conductance-enhanced dual series switch, according to one embodiment of the disclosure. A voltage doubler, which includes a cross-coupled NMOS pair ($M_{N1}$ and $M_{N2}$) in a deep n-well and two pumping capacitors ($C_{P1}$ and $C_{P2}$), allows CT and $CT_B$ to swing between $V_{O,i-1}$ and $V_{O,i}$ where $V_{O,i-1}$ and $V_{O,i}$ are the input and output voltages of the unit CP, respectively. A FBB technique decreases the $V_{TH}$ of the NMOS pair to increase the on-current for low $V_{IN}$. However, when one of the NMOS pair is turned off, a "fixed" FBB voltage causes a reverse current to flow into the input of the unit charge pump. This is the reason that the FBB technique for the low voltage charge pump considerably improves the voltage conversion efficiency (VCE), but not the power conversion efficiency (PCE), which limits the power throughput of the charge pump. In other words, the forward bias should be applied only when the MOSFET is turned on. Therefore, embodiments of the disclosure provide an SBB technique that avoids the reverse current. The body bias voltage ($V_{B1}$) for $M_{N1}$ is set to zero for the reverse mode when $M_{N1}$ should be completely turned off with minimized cut-off current. $V_{B1}$ is connected to $V_{O,i}$ when the FBB is required. The inadequate breakdown voltage of MOSFETs may require $V_{B1}$ to be connected to $V_{O,i+1}$ or $V_{O,i+2}$ rather than $V_{O,i}$. This dynamic body biasing can be implemented with only four switches ($M_{S1}$ to $M_{s4}$) and clock signals (E and $E_B$) used for the dual series switch after the voltage doubler.

Dual series switches $M_{P1}$ and $M_{P2}$ are controlled by E and $E_B$ from the SW-G enhancer. Some embodiments provide a charge pump that has a dual series switch that is driven between $-V_{IN}$ and $V_{OUT}$ without using an LS, and instead uses a negative charge pump. As mentioned before, a charge pump using an LS requires a robust design of the LS, which is hard to guarantee for low input voltages. Furthermore, the increased turn-on voltage of the disclosed charge pump for load switches that extends its operating region below ground relieves power delivery limitation of charge pump at low input voltage. Hence, a dual series PMOS switch that is controlled by the SW-G enhancer improves conductance even for low input voltages.

In some embodiments, the conductance improvement from the SW-G enhancement technique is sometimes large enough so SBB for the dual series switch does not need to be used in the design. In conventional approaches, a negative voltage is applied to the gate of the PMOS transistor. This usage for a negative voltage means static operation. However, in the present disclosure, the gate of the PMOS transistor is applied with the negative voltage and the most positive voltage alternately, for a switching operation of the charge pump. Therefore, the usage for a negative voltage in the disclosed embodiments of the disclosure is for dynamic (or switching) operation.

Figure 14:
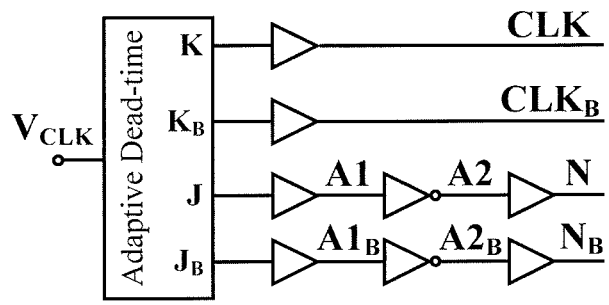
FIG. 14 shows an adaptive dead-time circuit and buffers for a charge pump, according to one embodiment of the disclosure.

FIG. 14 shows an adaptive dead-time circuit and buffers for a charge pump, according to one embodiment of the disclosure. In one example implementation, the adaptive dead-time circuit in FIG. 14 can be the adaptive dead-time circuit shown in FIG. 12. The output signals of the adaptive dead-time circuit, K, $K_B$, J, and $J_B$, should be buffered to drive the large pumping capacitors. Each buffer can be implemented by the tapered inverter chains.

Figure 15:
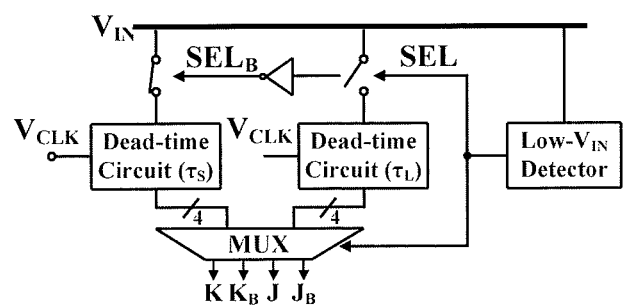
FIG. 15 shows an adaptive dead-time (AD) circuit, according to one embodiment of the disclosure.

FIG. 15 shows an adaptive dead-time (AD) circuit, according to one embodiment of the disclosure. The AD circuit generates four signals: CLK, $CLK_B$, N, and $N_B$. CLK and $CLK_B$, used for the unit CP, are overlapped while N and $N_B$ are non-overlapping signals. In FIG. 15, there are two dead-time circuits. Dead-time Circuit ($\tau_L$) long dead-timed signals, and Dead-time Circuit ($\tau_S$) generates short dead-timed signals. The long dead-timed signals and short dead-timed signals are sent to a multiplexer (MUX). Short or long dead-time signals are applied to the charge pump. The MUX chooses signals between short and long dead-time signals. The SEL signal selects dead-time signals, long or short, and turns on and off the two dead-time signal generators.

Figure 16:
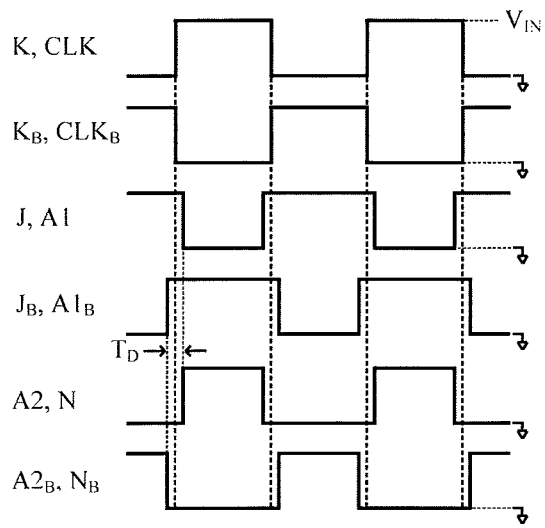
FIG. 16 shows a timing diagram of outputs of the AD circuit and buffers, according to one embodiment of the disclosure.

FIG. 16 shows a timing diagram of outputs of the AD circuit and buffers, according to one embodiment of the disclosure. The outputs that are all swinging between ground and $V_{IN}$ are used to pump CPs, such as the Unit-CP of each stage in FIG. 12, a negative CP, and two auxiliary CPs. The non-overlapping period, called the dead-time ($T_D$), should be not only sufficiently long to avoid a large short circuit current, but also sufficiently short to maximize the current transfer for high PCE.

In the conventional dead-time control technique using large fixed dead-times, the dead-times excessively increase with a decrease in $V_{IN}$. Hence, the delay of the delay cells in the dead-time circuit should be suitably controlled. A possible method to accomplish this is to sharpen the slow rising and falling transitions of delay cells by supplying more current as the input voltage decreases. This method consumes a large amount of power, which is inappropriate for an efficient charge pump. Another possible solution is to simplify the method of controlling delay cells by a binary control: long or short dead-time. This method dissipates a small amount of power and can be very efficient in low power applications. It is also very important to determine where the multiplexer (MUX) is placed. If the MUX is placed within the delay cells in the dead-time circuit, then the capacitance of delay cells is significantly increased such that the dead-time cannot be shortened as intended. Therefore, parallelism is exploited. This means that two dead-time circuits, one with short dead-time ($\tau_S$) (with low SEL) and one with long dead-time ($\tau_L$) (with high SEL), are supplied with power via sleep transistors, as shown in FIG. 15. The MUX forwards output of only one dead-time circuit into buffers. The Low-$V_{IN}$ Detector circuit in FIG. 15 is used to control the sleep transistors and the MUX. The PCE improvement of the minimized dead-time is obtained at the cost of area of added circuitries that consumes negligible power.

Figure 17:
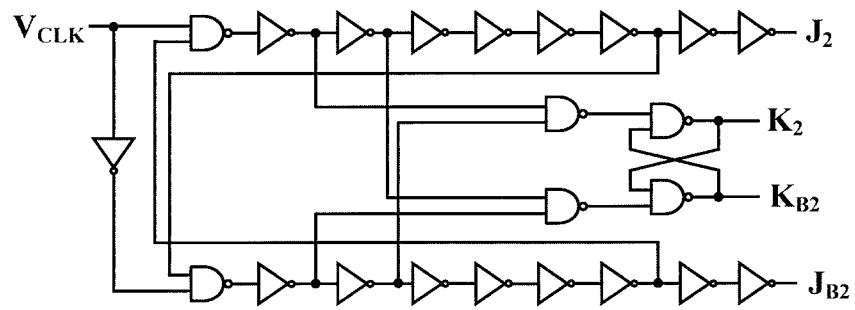
FIG. 17 shows a schematic of the dead-time circuit with $\tau_S$, according to one embodiment of the disclosure.
Figure 18:
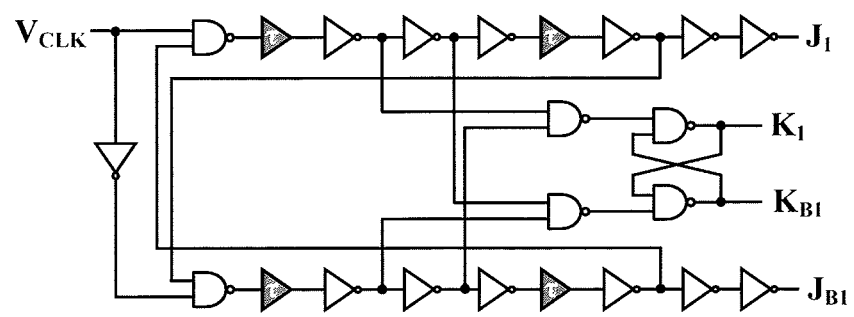
FIG. 18 is a circuit generating long dead-time ($\tau_L$), according to one embodiment of the disclosure.

FIG. 17 shows a schematic of the dead-time circuits with $\tau_S$, according to one embodiment of the disclosure. The dead-time circuit consists of two cross-coupled latches. In the dead-time circuit with a long non-overlapping period, additional delay gates marked with τ are added as shown in FIG. 18. One latch generates $J_1$ (or $J_2$) and $J_{B1}$ (or $J_{B2}$). Another latch generates $K_1$ (or $K_2$) and $K_{B1}$ (or $K_{B2}$).

Figure 19:
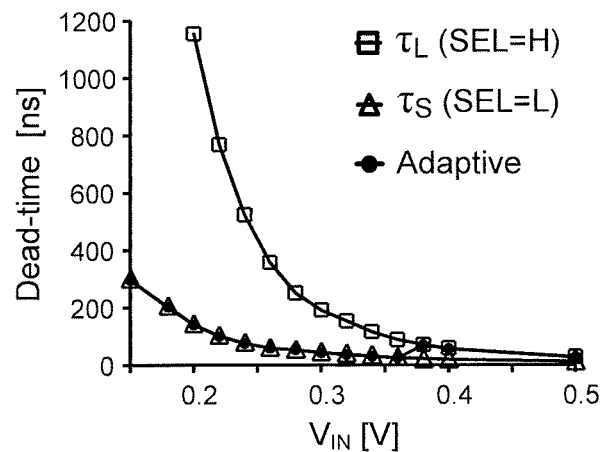
FIG. 19 shows the measured dead-times as a function of $V_{IN}$ for two different fixed dead-times and the adaptive dead-time, according to one embodiment of the disclosure.

FIG. 19 shows the measured dead-times as a function of $V_{IN}$ for two different fixed dead-times and the adaptive dead-time, according to one embodiment of the disclosure. In FIG. 19, the line marked with squares indicates the non-overlapping period of signals that the long dead-time circuit produces. The line marked with triangles is the non-overlapping period of short dead-time circuit. The output of the adaptive dead-time (AD) circuit tracks the optimal dead-time for the change of $V_{IN}$. At high input voltages, the dead-time of $\tau_L$ is long enough to avoid a short circuit current. As the input voltage decreases, $\tau_L$ is so prohibitively increased that the on-duty of the signal disappears. Therefore, the dead-time is adaptively shortened by selecting the output of the dead-time circuit generating $\tau_S$.

Figure 20:
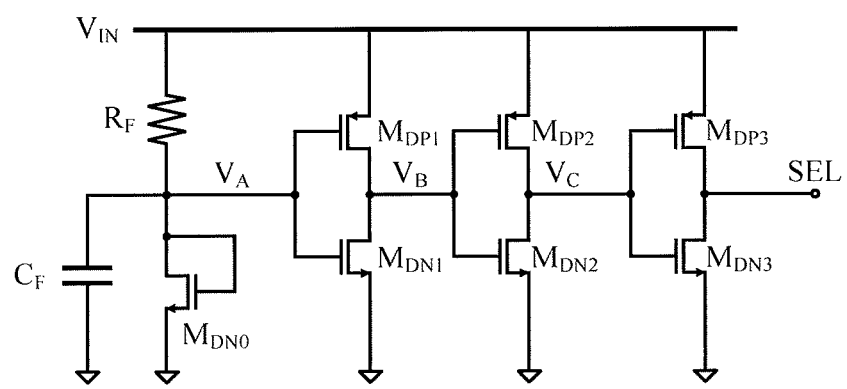
FIG. 20 shows a low-$V_{IN}$ detector used to sense the region where $\tau_S$ should be used, according to one embodiment of the disclosure.

FIG. 20 shows a low-$V_{IN}$ detector used to sense the region where $\tau_S$ should be used, according to one embodiment of the disclosure. The low-$V_{IN}$ detector has a simple circuit configuration. It includes an NMOS threshold voltage ($V_{TH,N}$) sensing circuit and inverter chains. The dead-time drastically increases as $V_{IN}$ goes down because the propagation delay of a gate is strongly dependent of the supply voltage when the supply voltage is less than the $V_{TH}$ plus $V_{DSATn}/2$, where $V_{DSATn}$ is the saturation drain voltage. Therefore, the $V_{TH,N}$ sensing circuit including a resistor $R_F$, a filtering capacitor $C_F$, and a diode-connected NMOS $M_{DN0}$. The boundary voltage $V_{BD}$ between the low $V_{IN}$ and the high $V_{IN}$ is defined as a level where both NMOS and PMOS are turned on for the transition of internal nodes. Under these conditions, $V_B$ can go to $V_{IN}$ from the floating state ($M_{DP1}$ on) and $V_C$ goes to ground ($M_{DN2}$ on) as $V_{IN}$ increases, which allows SEL to transition low to high and vice versa. Therefore, the $V_A$ that keeps $M_{DN1}$ off at the low $V_{IN}$ as well as the $V_B$ which turns on $M_{DN2}$ is a major contribution that determines the value of $V_{BD}$. This means that the dependence of $V_{TH,N}$ on temperature and process variations should not affect the AD circuit for the low-$V_{IN}$ charge pump.

Figure 21:
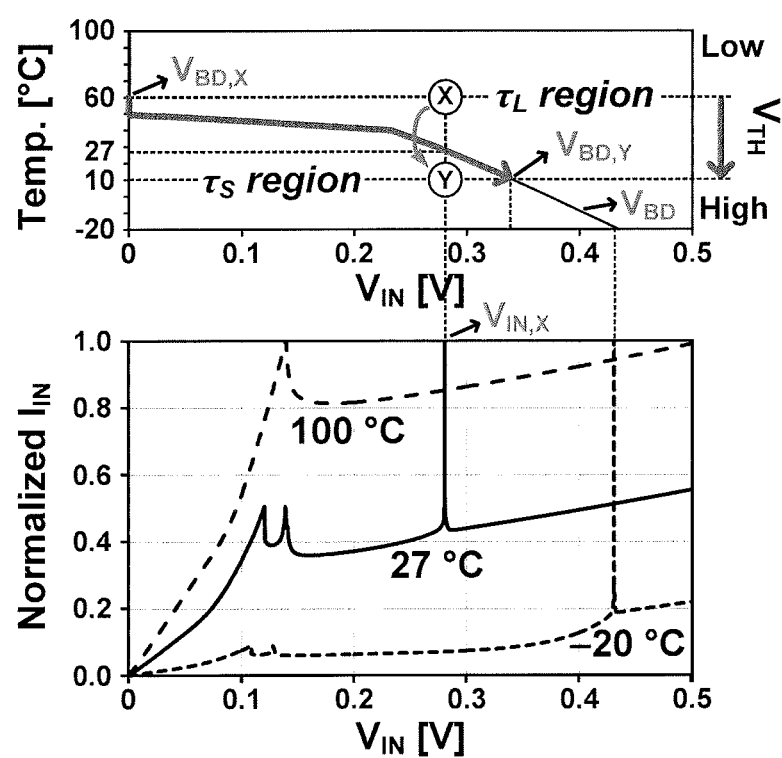
FIG. 21 shows the simulated current consumption of low-$V_{IN}$ detector for verifying temperature variation tolerance at a typical corner process, according to one embodiment of the disclosure.
Figure 22:
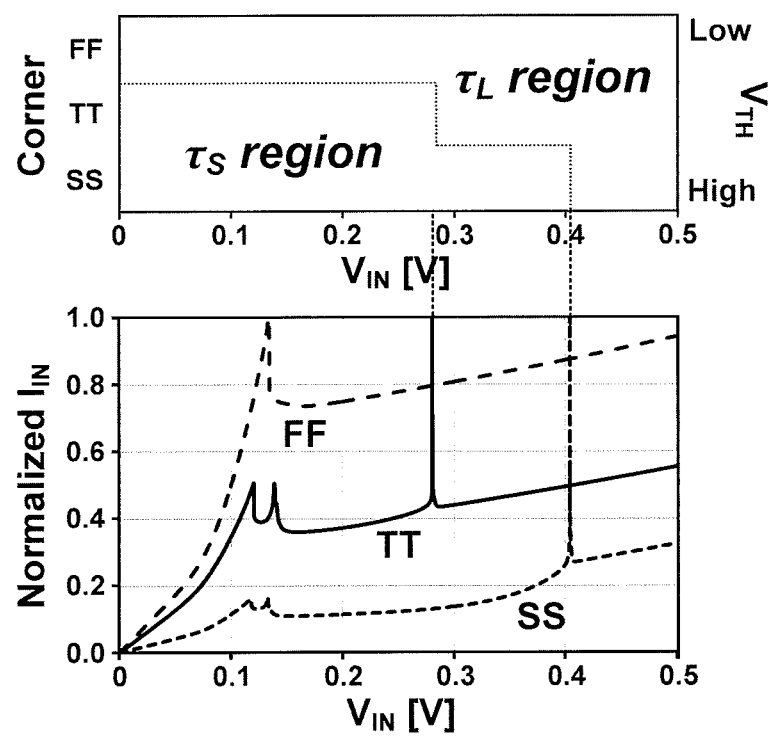
FIG. 22 shows the simulated current consumption of low-$V_{IN}$ detector for verifying process variation tolerance at 27° C., according to one embodiment of the disclosure.

FIG. 21 shows the simulated current consumption of low-$V_{IN}$ detector for verifying temperature variation tolerance at a typical corner process, according to one embodiment of the disclosure. FIG. 22 shows the simulated current consumption of low-$V_{IN}$ detector for verifying process variation tolerance at 27° C., according to one embodiment of the disclosure. Main variables that depend on changes of temperature are the mobility and $V_{TH}$ in the drain current equation of a MOSFET. An effect of changes in $V_{TH}$ on the drain current dominates at low supply voltage, while an effect of mobility dominates at high supply voltage. This means that the positive temperature dependence on drain current is shown in low-supply design. As shown in FIG. 21, $V_{TH}$ decreases as temperature goes up in the low voltage design. At high temperature, $V_{TH}$ is low. Therefore, the bottleneck of an excessive increase in delay of the dead-time does not exist, which allows $\tau_L$ to be used. At low temperature, $V_{TH}$ is high. As temperature decreases, $V_{BD}$ should be increased to use $\tau_S$ at low input voltages. Therefore, a dead-time prohibitively increased due to high $V_{TH}$ and low $V_{IN}$ can be relieved by selecting $\tau_S$. For example, $V_{IN}$ is $V_{IN,X}$ at 60° C. as marked with X in FIG. 21. In this condition, the AD circuit generates $\tau_L$ because $V_{BD}$ is ground. If temperature does down to 10° C., then shorter dead-time is required because $V_{TH}$ is increased. The AD circuit produces $\tau_S$ rather than $\tau_L$ with the increased $V_{BA}$ of $V_{BD,Y}$. In case of corner variations, the compensation behavior of the AD circuit is same as the case of temperature variation as shown in FIG. 22.

In some embodiments, the AD circuit experiences a chattering effect without a filtering capacitor $C_F$. In some embodiments, the high frequency noise from $V_{IN}$ is filtered by $C_F$. The low frequency noise from $V_{IN}$ negligibly affects the PCE of the CP, which makes a large filtering capacitor not required. FIG. 21 shows that the peak supply current flows at the transition of dead-time. For example, when $V_{IN}$ is $V_{IN,X}$ at 27° C., the nodes $V_B$ and $V_C$ in the low-$V_{IN}$ detector may have a finite DC voltage that does not stay at the rail voltages. However, the maximum supply current of the AD circuit that occurs at the transition point of SEL keeps less than 3 μA.

Figure 23:
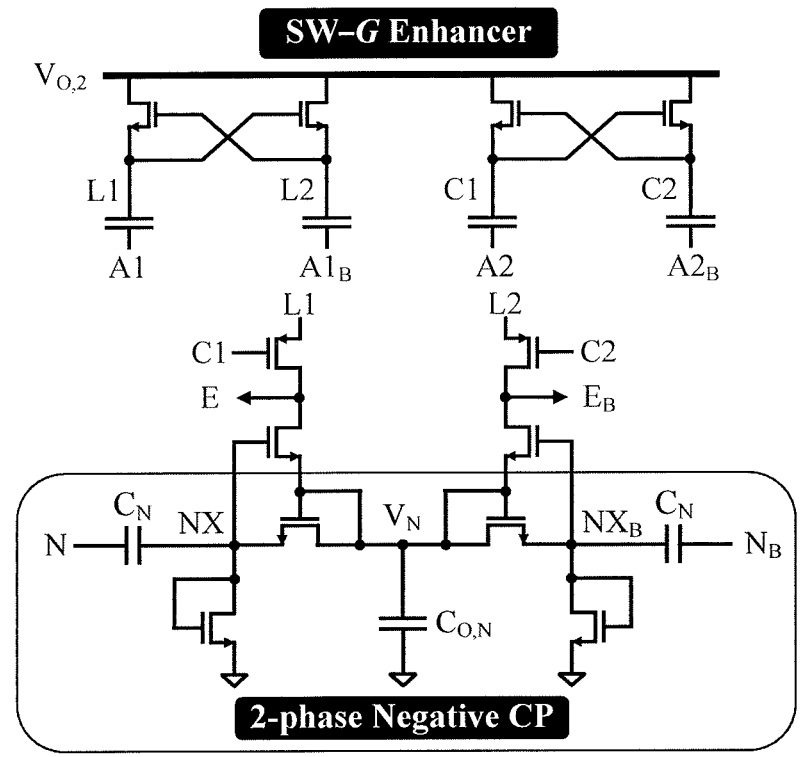
FIG. 23 shows a detailed schematic of the switch-conductance (SW-G) enhancer, according to one embodiment of the disclosure.
Figure 24:
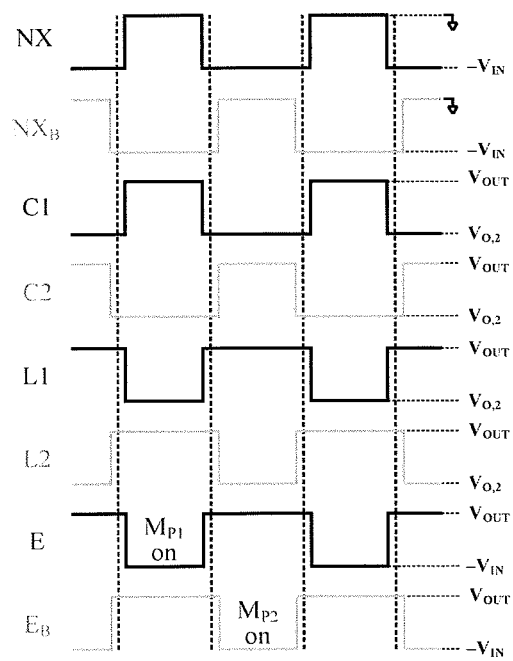
FIG. 24 shows timing diagram of the switch-conductance enhancer of FIG. 23.

FIG. 23 shows a detailed schematic of the SW-G enhancer, according to one embodiment of the disclosure. A two-phase negative charge pump used to increase $V_{GS}$ of the series switches allows E and $E_B$ to be driven down to $-V_{IN}$. Two small voltage doublers supplied by the output of the second stage generate control signals C1/C2 and L1/L2 to allow E and $E_B$ to turn off the series PMOS switches completely, respectively. FIG. 24 shows timing diagram of the switch-conductance enhancer of FIG. 23, according to one embodiment of the disclosure.

Figure 25:
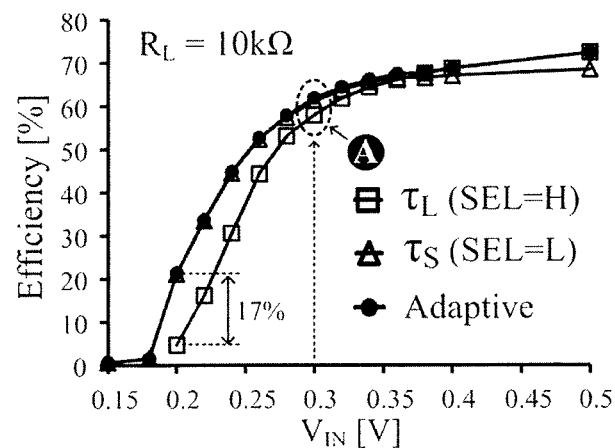
FIG. 25 is measured efficiency for three types of dead-times, according to one embodiment of the disclosure.
Figure 26:
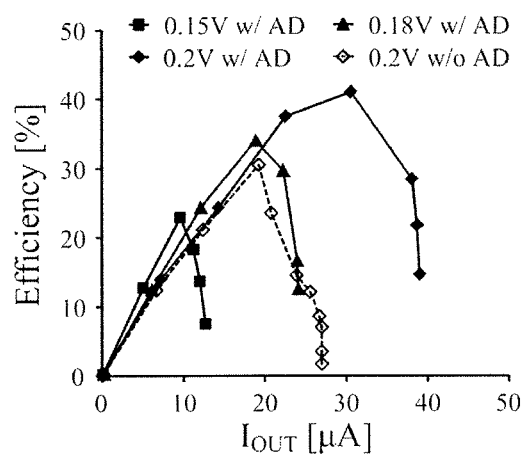
FIG. 26 is measured efficiency at low input voltages with and without the adaptive dead-time, according to one embodiment of the disclosure.
Figure 27:
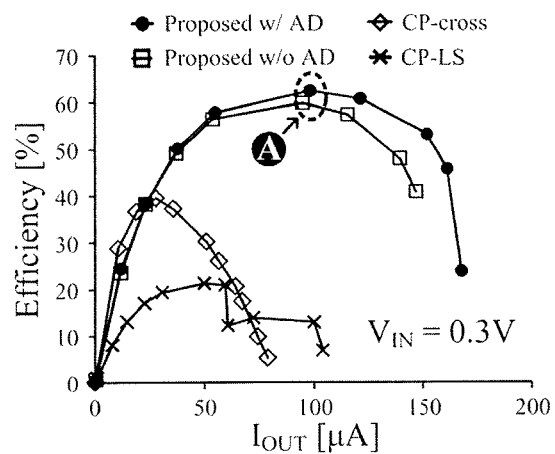
FIG. 27 is measured efficiency of conventional charge pumps (prior arts) and the proposed CP at $V_{IN}$ of 0.3V, according to one embodiment of the disclosure.

FIGS. 25-27 show measured efficiency graphs, according to some embodiments. More specifically, FIG. 25 is measured efficiency for three types of dead-times, FIG. 26 is measured efficiency at low input voltages with and without the adaptive dead-time, and FIG. 27 is measured efficiency of conventional charge pumps (prior art) and the proposed CP at $V_{IN}$ of 0.3V, according embodiments of the disclosure.

As shown in FIG. 25, the PCE improvement by the AD circuit is 17% at the low $V_{IN}$ of 0.2V and $R_L$ of 10 kΩ. In some embodiments, the disclosed charge pump without the AD can work at a minimum $V_{IN}$ of 0.2V. However, in some embodiments, the disclosed charge pump can work at $V_{IN}$ down to 0.15V when the AD is turned on. Moreover, the output power throughput can be extended with the AD.

FIG. 26 shows the efficiency comparison and the extended range of the output current $I_{OUT}$ at the low $V_{IN}$ domain of less than 0.2V. The PCE comparisons among the CP-cross, CP-LS, and disclosed charge pump are shown in FIG. 27. Pumping capacitors (10 nF), switches on the power path, and buffers driving pumping capacitors have same sizes for three CPs. The conventional CPs exhibit poor PCE at a low $V_{IN}$ of 0.3V. The sunken region at the curve of the CP-LS is caused by the failure of LS. Only when $V_{IN}$ is higher than 0.3V, the CP-cross has slightly better PCE at a light load because the proposed charge pump has additional power-consuming circuitry in comparison to the CP-cross. The circled "A" in FIG. 27 indicates the PCE improvement due to the AD under the same conditions ($R_L$ of 10 kΩ and $V_{IN}$ of 0.3V) as the circled A marked in FIG. 25.

Figure 28:
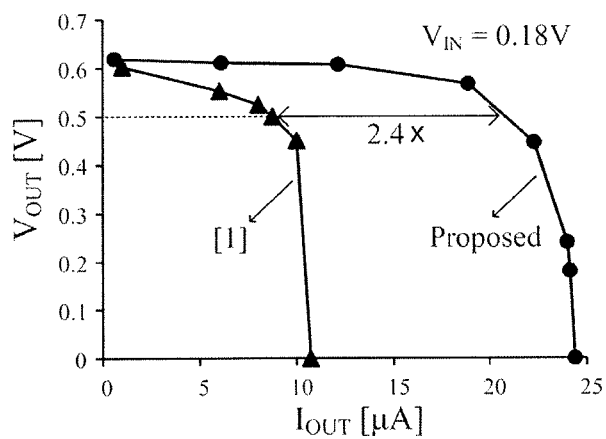
FIG. 28 is measured efficiency of a conventional charge pump with the forward body biasing (prior art) and the disclosed charge pump with the switching body biasing at $V_{IN}$ of 0.18V, according to one embodiment of the disclosure.

FIG. 28 is measured efficiency of a conventional charge pump with the forward body biasing (prior art) and the disclosed charge pump with the switching body biasing at $V_{IN}$ of 0.18V, according to one embodiment of the disclosure. As shown in FIG. 28, the disclosed charge pump improves a maximum output current by 240% as compared to the charge pump design in conventional approaches. As mentioned, the charge pump design in the prior art uses only the FBB, which causes power loss due to the sub-threshold reverse current during off-state of switches at low input voltages. However, the disclosed charge pump exploits the SBB technique using both FBB and RBB, as well as the AD and SW-G enhancement techniques. As a result, the disclosed charge pump shows better power throughput and operates at lower input voltages than the charge pump in the prior art.

Figure 29:
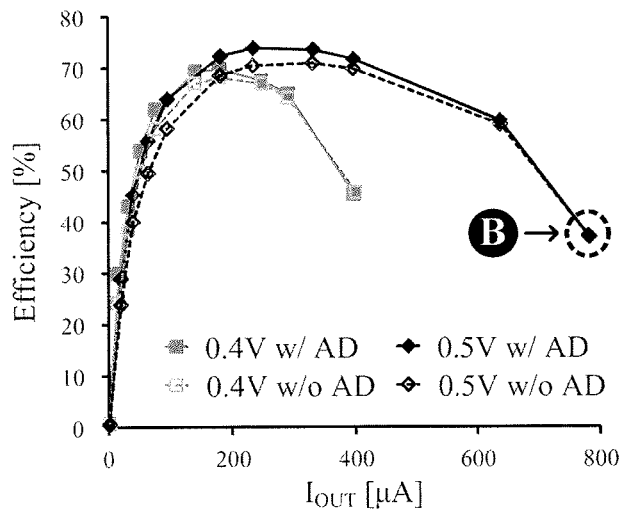
FIG. 29 is power conversion efficiency curves at high $V_{IN}$ with and without the adaptive dead-time, according to one embodiment of the disclosure.

FIG. 29 is power conversion efficiency curves at high $V_{IN}$ with and without the adaptive dead-time, according to one embodiment of the disclosure. FIG. 29 shows the PCE curves at high input voltages with and without the AD. In the domain of high input voltages, the non-overlapping period of clock signals should be long enough. In one embodiment, the charge pump with the AD circuit achieves the PCE improvement of 6% compared to the conventional constant dead-time circuit that generates only $\tau_S$ by optimizing the charge pump for the range of low input voltages.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the objectives of the disclosure. Variations of those preferred embodiments may become apparent to those of ordinary skill in the art upon reading the foregoing description. The inventors expect skilled artisans to employ such variations as appropriate, and the inventors intend for the disclosed embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While the forgoing is directed to embodiments of the present disclosure, other and further embodiments of the disclosure may be devised without departing from the basic scope thereof.

The invention claimed is:

1. A charge pump circuit, comprising:
two or more unit charge pumps arranged in series, wherein each unit charge pump includes:
a first pumping capacitor,
a second pumping capacitor,
two cross-coupled NMOS switches, wherein the first pumping capacitor is coupled to the source of a first cross-coupled NMOS switch and the gate of the second cross-coupled NMOS switch, and the second pumping capacitor is coupled to the source of the second cross-coupled NMOS switch and the gate of the first cross-coupled NMOS switch, and
four PMOS switches for switching body biasing applied to the two cross-coupled NMOS switches, wherein the four PMOS switches are controlled by a pair of complementary clock signals having an adjustable dead-time based on an input voltage for the charge pump circuit, wherein the adjustable dead-time corresponds to a non-overlapping time period between a rising edge of one of the complementary clock signals and a corresponding falling edge of the other of the complementary clock signals.

2. The charge pump according to claim 1, further comprising:
an adaptive dead-time circuit that includes dead-time circuits with different lengths of dead-times and an input voltage detector.

3. The charge pump according to claim 2, wherein each unit charge pump doubles an input voltage of the unit charge pump by using overlapping clock signals, wherein the overlapping clock signals are generated by the adaptive dead-time circuit.

4. The charge pump according to claim 2, wherein the adaptive dead-time circuit forwards outputs of one of the dead-time circuits with different length of dead-times to the one or more unit charge pumps.

5. The charge pump according to claim 2, further comprising:
a switch-conductance enhancer that includes a negative charge pump and auxiliary charge pumps,
wherein the adaptive dead-time circuit forwards outputs of one of the dead-time circuits with different length of dead-times to the switch-conductance enhancer.

6. The charge pump according to claim 2, wherein one dead-time circuit is selected by the input voltage detector according to an input voltage level of the charge pump circuit.

7. The charge pump according to claim 2, wherein an input to the charge pump circuit is the supply voltage of the adaptive dead-time circuit.

8. The charge pump according to claim 2, wherein:
at low input voltage levels, the input voltage detector commands the adaptive dead-time circuit with short dead-time to be selected in the adaptive dead-time circuit; and
at high input voltage levels, the input voltage detector commands the adaptive dead-time circuit with long dead-time to be selected in the adaptive dead-time circuit;
wherein a threshold voltage defines a boundary between low and high input voltage levels.

9. The charge pump according to claim 1, further comprising:
a switch-conductance enhancer that includes a negative charge pump and auxiliary charge pumps.

10. The charge pump according to claim 9, wherein each unit charge pump further includes:
two series switches, wherein the four PMOS switches for switching body biasing and the two series switches are controlled by signals that are generated by the switch-conductance enhancer.

11. The charge pump according to claim 9, wherein the four PMOS switches for switching body biasing are driven by signals from the switch-conductance enhancer.

12. The charge pump according to claim 11, wherein the signals of the switch-conductance enhancer swing between a negative voltage and an output voltage level of the charge pump circuit.

13. The charge pump according to claim 12, wherein the negative voltage is generated by the negative charge pump.

14. The charge pump according to claim 13, wherein the output voltage level of the charge pump circuit is generated by the auxiliary charge pumps.

15. The charge pump according to claim 1, wherein an output of a first unit charge pump is connected to an input of a second unit charge pump, and an output of the second unit charge pump is connected to an input of a third unit charge pump.

16. A charge pump circuit, comprising:
a first pumping capacitor;
a second pumping capacitor;
two cross-coupled NMOS switches, wherein the first pumping capacitor is coupled to the source of a first cross-coupled NMOS switch and the gate of the second cross-coupled NMOS switch, and the second pumping capacitor is coupled to the source of the second cross-coupled NMOS switch and the gate of the first cross-coupled NMOS switch; and
four PMOS switches for switching body biasing applied to the two cross-coupled NMOS switches, wherein the four PMOS switches are controlled by a pair of complementary clock signals having an adjustable dead-time based on an input voltage for the charge pump circuit, wherein the adjustable dead-time corresponds to a non-overlapping time period between a rising edge of one of the complementary clock signals and a corresponding falling edge of the other of the complementary clock signals.

17. The charge pump circuit according to claim 16, wherein the charge pump circuit is connected to an adaptive dead-time circuit that includes dead-time circuits with different lengths of dead-times and an input voltage detector.

18. The charge pump circuit according to claim 17, wherein the charge pump circuit doubles an input voltage of the charge pump circuit by using overlapping clock signals, wherein the overlapping clock signals are generated by the adaptive dead-time circuit.

19. The charge pump circuit according to claim 17, wherein the charge pump circuit is further connected to a switch-conductance enhancer that includes a negative charge pump and auxiliary charge pumps, wherein the adaptive dead-time circuit forwards outputs of one of the dead-time circuits with different length of dead-times to the switch-conductance enhancer.

20. The charge pump circuit according to claim 19, wherein the four PMOS switches for switching body biasing are driven by signals from the switch-conductance enhancer.

21. An adaptive dead-time circuit, comprising:
a short dead-time circuit;
a long dead-time circuit, wherein a dead-time of the long dead-time circuit is longer than a dead-time of the short dead-time circuit;
an input voltage detector coupled to an input voltage level of a charge pump circuit; and
a multiplexer configured to select between an output of the short dead-time circuit and an output of the long dead-time circuit based on a signal from the input voltage detector to determine an output of the adaptive dead-time circuit;
wherein the output of the adaptive dead-time circuit provides an adjustable dead-time for a pair of complementary clock signals, wherein the adjustable dead-time corresponds to a non-overlapping time period between a rising edge of one of the complementary clock signals and a corresponding falling edge of the other of the complementary clock signals.

22. The adaptive dead-time circuit according to claim 21, wherein the output of the adaptive dead-time circuit is forwarded to the charge pump circuit, wherein the charge pump circuit includes one or more unit charge pumps.

23. The adaptive dead-time circuit according to claim 22, wherein each unit charge pump doubles an input voltage of the unit charge pump by using overlapping clock signals, wherein the overlapping clock signals are generated by the adaptive dead-time circuit.

24. The adaptive dead-time circuit according to claim 21, wherein an input to the charge pump circuit is a supply voltage of the adaptive dead-time circuit.

25. The adaptive dead-time circuit according to claim 21, wherein:
at low input voltage levels, the input voltage detector commands the adaptive dead-time circuit with short dead-time to be selected in the adaptive dead-time circuit; and
at high input voltage levels, the input voltage detector commands the adaptive dead-time circuit with long dead-time to he selected in the adaptive dead-time circuit;
wherein a threshold voltage defines a boundary between low and high input voltage levels.

26. A system, comprising:
a switch-conductance enhancer circuit coupled to a charge pump circuit, the switch-conductance enhancer circuit comprising:
a negative charge pump that generates a negative voltage as output; and
auxiliary charge pumps coupled to an output of the negative charge pump,
wherein an output voltage level of the charge pump circuit is generated by the auxiliary charge pumps; and
the charge pump circuit, comprising four PMOS switches for switching body biasing that are controlled by signals that are generated by the switch-conductance enhancer circuit, wherein the signals of the switch-conductance enhancer swing between a negative voltage and an output voltage level of the charge pump circuit based on a pair of complementary clock signals having adjustable dead-time based on an input voltage for the charge pump circuit, wherein the adjustable dead-time corresponds to a non-overlapping time period between a rising edge of one of the complementary clock signals and a corresponding falling edge of the other of the complementary clock signals.

27. The system according to claim 26, wherein the adaptive dead-time circuit selects between an output of a short dead-time circuit and an output of a long dead-time circuit for forwarding to the switch-conductance enhancer.

* * * * *